Patented Oct. 27, 1942

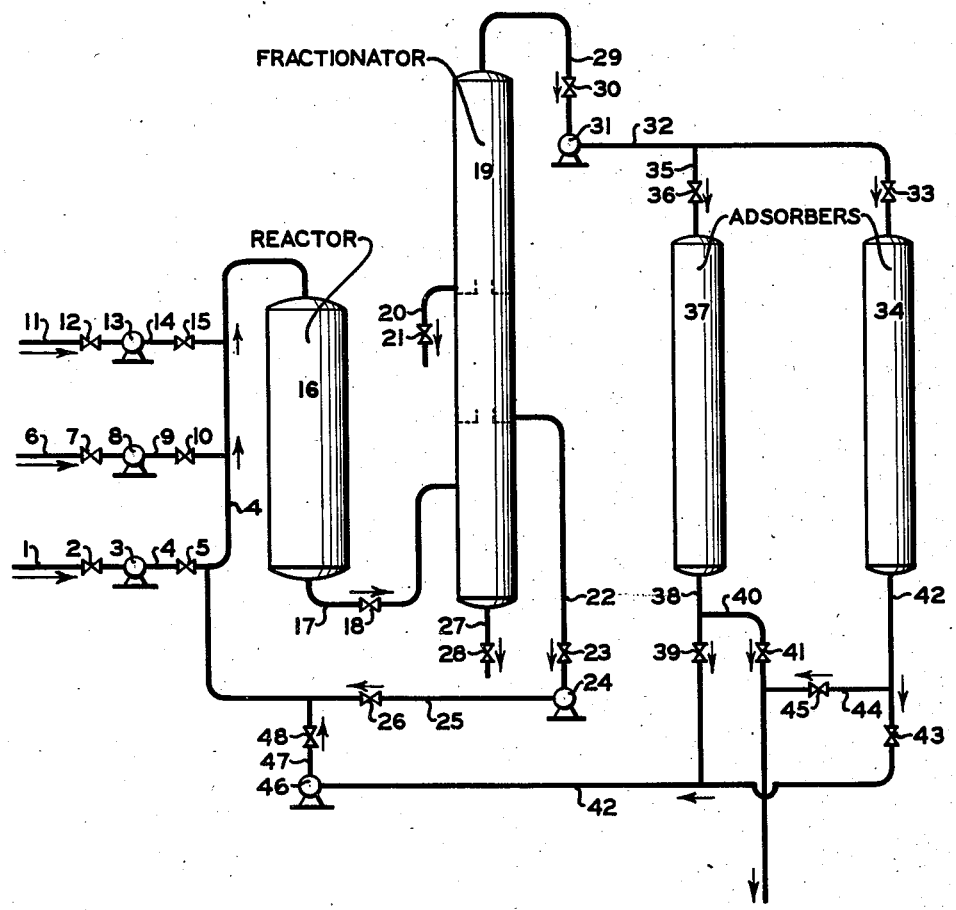

2,300,235

UNITED STATES PATENT OFFICE 2,300,235

ISOMERIZATION OF PARAFFINS

Herman Pines and Herman S. Bloch, Chicago, Ill., assignors to Universal Oil Products Company, Chicago, Ill., a corporation of Delaware Application October 12, 1940, Serial No. 360,906

6 Claims. (Cl. 260—676)

This invention relates to the treatment of paraffin hydrocarbons of normal or mildly-branched chain structure.

In a more specific sense the invention is concerned with a process whereby normal or mildly-branched chain paraffin hydrocarbons are converted into isoparaffin or more-branched chain paraffin hydrocarbons, the process involving the use of special catalysts and particular conditions of operation which favor the isomerization reactions so that relatively high yields of the iso or more-branched chain compounds are produced.

The formation of the iso or more-branched chain paraffin hydrocarbons from the corresponding less-branched chain liquid paraffins is desirable because of the generally higher antiknock value of the iso compounds. Furthermore, the branched chain paraffins, both gaseous and liquid being generally more reactive than the corresponding normal hydrocarbons, may be utilized in the production of other branched chain paraffins, by so-called alkylation reactions in the presence of suitable catalysts. Also, lower boiling isoparaffins, such as isobutane and isopentane, may be dehydrogenated to the corresponding branched chain olefins, which are utilizable for the production of high quality aviation gasoline, by a combination of catalytic polymerization followed by hydrogenation of the polymers, producing paraffinic motor fuel.

In one specific embodiment the present invention comprises a process for isomerizing a normal paraffin hydrocarbon which comprises subjecting said normal paraffin hydrocarbon to contact with a supported aluminum chloride-containing catalyst to form an isomerization product containing a substantial proportion of more-branched chain paraffin hydrocarbons; separating said product into an isomerization mixture comprising essentially unconverted normal paraffin and more-branched chain paraffin hydrocarbons and a gas mixture comprising essentially hydrogen, hydrogen chloride, ethane, and methane; subjecting said gas mixture to contact with a granular solid adsorbent for substantial adsorption of said hydrogen chloride; desorbing a substantial proportion of said adsorbed hydrogen chloride from said adsorbent; dissolving said desorbed hydrogen chloride in said normal paraffin hydrocarbon being charged to contact with said supported aluminum chloride-containing catalyst; separating said isomerization mixture into unconverted normal paraffin hydrocarbon, a generally lower-boiling fraction comprising essentially branched chain paraffins, and a higher boiling paraffin mixture; and recycling said unconverted normal paraffin hydrocarbon to further isomerization treatment.

In a further embodiment the present invention comprises the isomerization of mildly-branched chain paraffins into more-highly branched chain paraffins by a treatment similar to that set forth for isomerizing a normal paraffin hydrocarbon.

Normal paraffin hydrocarbons with which the process of the present invention is concerned may be either normally gaseous or liquid. Normal butane, which constitutes the gaseous normal paraffin which may be isomerized by the process of this invention, is produced in considerable quantities in the oil refining industry. Both normal butane and isobutane occur in substantial amounts in natural gases (in which the normal compound usually predominates), in refinery gases which are evolved from crude petroleum storage tanks, and in the primary distillation of crudes; and they are also present in considerable percentages in the gases produced incidental to the cracking of heavy petroleum fractions for the production of gasoline. In the case of cracked gas mixtures, the relative proportions of iso and normal butanes vary, but the ratio of the iso to the normal compound is as a rule considerably higher than in natural gas.

Butanes may be considered as more or less marginal compounds in respect to their desirability in ordinary gasoline, that is, a certain percentage of them is essential for sufficient vapor pressure to insure ease in starting, while an excess tends to produce vapor lock. For these reasons the total percentage of 4-carbon atom hydrocarbons is commonly adjusted in conjunction with the boiling range and vapor pressure of the other gasoline components to produce a gasoline of desirable starting characteristics according to seasonal demands.

The butanes at the present time bear a further important relationship to oil refining in that their excess production is being utilized as a source of gasoline either by ordinary thermal cracking or by special catalytic dehydrogenation processes followed by polymerization in which catalysts may or may not be used. Investigations have shown that isobutane is considerably more amenable to cracking and dehydrogenation, both with and without catalysts, than the normal compound. Considering the corresponding mono-olefins, the normal butenes are considerably more difficult to polymerize, either thermally or catalytically, than isobutene, and it is found, also that the octenes representing the dimers of isobutene are of higher antiknock value than those from normal butenes, which holds also for the octanes produced by hydrogenation. It is, therefore, of considerable importance at the present time to convert as much as possible of the normal butane production into isobutane.

Liquid normal paraffins are produced in considerable quantities in the oil refining industry. They occur in substantial amounts in natural gasolines, in the higher boiling constituents of natural gas commonly known as "casing head gasoline," and in gasolines produced in relatively high yields by the cracking of relatively heavy petroleum fractions. In the case of cracked gasolines, the relative proportions of iso and normal paraffins vary.

Materials suitable for use as paraffin isomerizing catalysts comprise substantially anhydrous aluminum chloride alone or in admixture with relatively smaller proportions of a chloride of a metal selected from those of iron, zinc, copper, and others. The aluminum chloride or metal halide mixture may be used either as such or supported upon a substantially inert carrier selected from the group consisting of activated carbon, pumice, fuller's earth, raw and acid-treated clays, diatomaceous earth, celite, unglazed porcelain, crushed firebrick, a silica-alumina composite, etc.

The term "activated carbon" as used in the present specification and claims is intended to include any type of prepared carbon or carbonaceous material which is more or less granular and possessed of good porosity and structural strength and which has been prepared by general steps involving the leaching of adsorbed materials from granular residual carbonaceous materials such as wood char and various varieties of coke by mineral acids and by the controlled heating, preferably under vacuum, to expel adsorbed liquids and gases. It is recognized that various forms of active granular chars will vary considerably in adsorptive capacity so that therefore the properties of catalysts prepared when using them in accordance with the present invention will vary both in respect to the amount of aluminum chloride which they are able to absorb and in respect to the periods of service in which they are able to maintain a practical activity in different organic reactions.

While these catalyst-forming materials may be used more or less interchangeably, some are more efficient than others and it is not intended to imply that they are definitely equivalent. Also it frequently happens that one type of carrier or support is better for use with a given metal halide catalyst, depending upon the ratio of the metal halide to support found experimentally to be best for the furtherance of the paraffin-isomerizing reaction.

In the presence of a composite catalyst such as those hereinabove set forth, the paraffin hydrocarbon charged may be converted into approximately 30–60% or more of more-highly branched chain paraffins while utilizing a catalyst temperature within the approximate limits of 100° and 650° F. and under a pressure of from substantially atmospheric to approximately 3000 pounds per square inch. Evidently the use of superatmospheric pressure diminishes the volatilization of aluminum chloride from the catalyst and also tends to depress undesirable side reactions which would result in the formation of hydrogen and of relatively low molecular weight hydrocarbons so that the desired isomerization proceeds more or less in one direction until an equilibrium is established.

Experiments have indicated that good results are obtained in paraffin isomerizations when from about 0.5% to about 25% by weight of hydrogen chloride is present in the reaction mixture. This amount of hydrogen chloride may be introduced directly, as such or as a solution in butane, or partly produced in situ by using amounts of water or steam which cause a certain amount of hydrolysis of the metal chloride catalyst.

While inert gases such as nitrogen may be employed alternatively for imposing the desired pressure, experiments have shown that hydrogen is preferable as its presence seems to minimize undesirable side reactions involving decomposition rather than the desired isomerization.

An essential feature of the present invention is the combination of steps employed for separating hydrogen chloride from the isomerization products and from the relatively small amounts of accompanying decomposition products and for recovering said hydrogen chloride in suitable form for recycling to further use in the isomerization of more of the normal or mildly branched chain paraffinic material charged. This recovery of hydrogen chloride is accomplished, as will be described subsequently in more detail, by passing a mixture of light gaseous products of the process comprising essentially hydrogen chloride, hydrogen, ethane, and methane through an adsorber containing a suitable granular solid maintained at some temperature within the approximate limits of 0° and 210° F. and under a pressure between about 500 and about 2000 pounds per square inch for adsorption of hydrogen chloride. Suitable granular solid adsorbents may comprise such substances as dry charcoal of either animal or vegetable origin, similar activated chars derived from petroleum coke, calcined activated alumina, calcined silica gel, calcined diatomaceous earth, or any active and porous earth or clay which has been calcined at a temperature sufficient to eliminate a high proportion of moisture. Suitable adsorbents have some selectivity in adsorbing hydrogen chloride preferentially to methane or ethane which may also be present in the lighter fraction of the isomerization products derived from isomerization of paraffins in the presence of hydrogen chloride and an aluminum chloride-containing catalyst.

It is preferable to utilize two or more reactors for effecting such an adsorptive removal of hydrogen chloride in order that while one reactor is in use for adsorption purposes, the other may be treated for recovery of hydrogen chloride previously adsorbed by the granular adsorbent contained therein. Such removal from an adsorbent of adsorbed hydrogen chloride may be termed desorption. Desorption may be accomplished either by raising the temperature of the adsorbent, by lowering the pressure on the adsorbent, or by simultaneously increasing the temperature and lowering the pressure. During desorption the adsorber temperature may be between about 100° and about 500° F. and the pressure may be reduced to atmospheric or below but generally not below 0.1 atmosphere.

For the purpose of illustrating the cooperative combination of steps characteristic of the present invention, the attached drawing shows diagrammatically means embodying a typical process flow for isomerizing a normal or mildly-branched chain paraffin into a more-highly branched chain paraffin and for simultaneously recovering and re-using the hydrogen chloride employed in the reaction. For convenience in describing it, the process flow given illustrates the isomerization of normal butane into isobutane, but with no intention of limiting the invention to the isomerization of any particular paraffinic hydrocarbon.

Referring to the drawing, normal butane may be introduced through line 1 containing valve 2 to pump or compressor 3 which discharges through line 4 containing valve 5. Simultaneously hydrogen may be introduced through line 6 containing valve 7 to compressor 8 which discharges through line 9 and valve 10 into line 4, already mentioned, while hydrogen chloride may be admitted through line 11 containing valve 12 to compressor 13 which discharges through line 14 and valve 15 to line 4 through which the commingled mixture of normal butane, hydrogen, and hydrogen chloride may be conducted to isomerizing reactor 16, although more than one isomerizing reactor may be employed, if desired. Alternatively hydrogen chloride may be charged in the form of a solution in n-butane, if desired, or it may be introduced under pressure from any suitable source. Isomerizing reactor 16 may consist of a chamber containing a granular catalyst comprising essentially aluminum chloride or a mixture of aluminum chloride and another metal halide deposited upon a substantially inert carrier such as described previously in this specification. This isomerizing treatment may be effected at a temperature within the approximate limits of 100° and 650° F. under a pressure at some point in the range of substantially atmospheric to approximately 3000 pounds per square inch.

Thus isomerizing reactor 16 may contain a granular catalytic material which is relatively non-volatile under the conditions of use and which in the presence of hydrogen chloride is capable of producing a substantial degree of isomerization of normal butane to isobutane.

From reactor 16 a mixture comprising essentially isobutane, unconverted normal butane, hydrogen, hydrogen chloride, and a relatively small amount of decomposition products including propane and lighter hydrocarbons may be conducted through line 17 and valve 18 to fractionator 19 of conventional design to separate therefrom a fraction comprising essentially ethane and lighter gases, isobutane alone or admixed with a relatively small amount of propane, normal butane, and a mixture of pentanes and higher hydrocarbons. Said isobutane, or isobutane mixed with small amounts of propane, may be withdrawn from fractionator 19 through line 20 containing valve 21 to cooling and storage, not shown in the diagrammatic drawing. Normal butane separated in fractionator 19 may be conducted therefrom through line 22 and valve 23 to pump or compressor 24 which discharges through line 25 and valve 26 into line 4, already mentioned, through which normal butane is being conducted to isomerization. Pentanes and higher hydrocarbons may be withdrawn from the lower portion of fractionator 19 through line 27 and valve 28 to storage.

Light gases comprising essentially hydrogen, hydrogen chloride, ethane, and methane may be directed from near the top of fractionator 19 through line 29 and valve 30 to compressor 31 which discharges through line 32 through branch line 35 and valve 36 to adsorber 37. The adsorbers may be cooled by means not shown to maintain a temperature between about 0° and about 210° F. while they are operated under a pressure within the approximate range of 500 to 2000 pounds per square inch.

The adsorption system comprises at least two units such as adsorbers 34 and 37 although a larger number may be employed if desired and either single or multiple units may be used in conjunction with each other. The adsorbers are so arranged that one may be in use for adsorbing hydrogen chloride from said light gases while the other is being desorbed of hydrogen chloride which has accumulated upon the adsorbent in a prior adsorbing treatment of the effluent light gases. Thus if the light gases from fractionator 19 are being pumped into adsorber 37, valves 33, 39, and 45 are shut so that the gases pass through line 35 and valve 36 into adsorber 37 and from thence the hydrogen chloride-free gases pass through lines 38 and 40 and valve 41 to waste or to other use while the hydrogen chloride remains adsorbed by the granular filler in adsorber 37. Simultaneously hydrogen chloride previously adsorbed by the granular material in adsorber 34 is being desorbed, and pumped from adsorber 34 through line 42 and valve 43 by pump 46 which discharges through line 47 and valve 48 into line 25, already mentioned, through which normal butane is being recycled to further isomerizing treatment as hereinabove set forth.

When the hydrogen chloride has been desorbed sufficiently from the adsorbent in adsorber 34 and the adsorbent in adsorber 37 has become substantially saturated with hydrogen chloride, valves 36, 41, and 43 are shut and valves 33, 39 and 45 are opened, adsorber 34 thereafter being used for treating the light gases and hydrogen chloride being desorbed from the adsorbent in adsorber 37 and then pumped by pump 46 and recycled to isomerizing reactor 16. If desired the desorption may be effected by increasing the temperature of the chamber containing the adsorbent without substantial lowering of pressure or by simultaneous increasing the temperature and lowering the pressure as desired.

The following example is introduced to show results normally expected in the operation of the process, although with no intention of unduly limiting the generally broad scope of the invention:

A mixture containing 84.5 molecular proportions of normal butane, 12.4 molecular proportions of anhydrous hydrogen chloride, and 3.1 molecular proportions of hydrogen is passed at 390° F. under a pressure of 650 pounds per square inch through a reactor containing a composite of 37.6% by weight of substantially anhydrous aluminum chloride and 62.4% by weight of activated cocoanut charcoal in the form of 4–10 mesh granules. When the normal butane is charged as liquid at a rate corresponding to a liquid space velocity of 1, the reaction products consist of hydrogen and hydrogen chloride originally charged and a hydrocarbon mixture comprising essentially 0.4% by volume of methane, 0.2% ethane, 2.3% propane, 46.0% isobutane, 49.4% unconverted normal butane, and 1.7% pentane. Fractional distillation of said reaction product substantially separates propane and higher hydrocarbons from a light gas mixture with approximately the following volume per cent composition: methane, 2.0%; ethane, 1.0%; propane, 1.5%; hydrogen, 19.2%; and hydrogen chloride, 76.3%.

During passage of said light gas mixture through activated cocoanut charcoal at an hourly rate corresponding to a gaseous space velocity of 2000 at 75° F. under a pressure of 700 pounds per square inch, approximately 95% of the hydrogen chloride is adsorbed therefrom by the charcoal. After passage of approximately 1000 volumes of said light gas mixture through 1 volume of adsorbent, the removal of hydrogen chloride becomes less complete. The stream of said light gas mixture is then stopped, the pressure is reduced to atmospheric, and then the adsorber is evacuated to a pressure of approximately 0.1 atmosphere. The hydrogen chloride-containing gas mixture recovered during said evacuation contains 90–95% of hydrogen chloride mixed with relatively minor proportions of hydrogen, methane, ethane, and propane.

Hydrogen chloride-containing gas recovered as hereinabove set forth is suitable for commingling with normal butane being charged to contact with the aluminum chloride-charcoal isomerizing catalyst.

The character of the present invention and particularly its commercial value are evident from the foregoing specification and example, although the proper scope of the invention is not limited to exact correspondence with the descriptive and numerical material presented.

We claim as our invention:

1. In the isomerization of paraffins in the presence of hydrogen chloride and an isomerizing catalyst comprising substantially anhydrous aluminum chloride, the method which comprises separating from the products of the isomerizing step an isomerized paraffinic fraction, unconverted paraffinic hydrocarbons and a gas mixture containing hydrogen chloride, contacting said gas mixture with a solid adsorbent to separate hydrogen chloride from the mixture by adsorption thereof in the solid adsorbent, subsequently desorbing hydrogen chloride from the solid adsorbent and supplying the same to the isomerizing step.

2. In the isomerization of paraffins in the presence of hydrogen chloride and an isomerizing catalyst comprising substantially anhydrous aluminum chloride, the method which comprises separating from the products of the isomerizing step an isomerized paraffinic fraction, unconverted paraffinic hydrocarbons and a gas mixture containing hydrogen chloride, contacting said gas mixture with a solid adsorbent to separate hydrogen chloride from the mixture by adsorption thereof in the solid adsorbent, subsequently desorbing hydrogen chloride from the solid adsorbent and commingling the same with said unconverted paraffinic hydrocarbons, and supplying the resultant mixture to the isomerizing step.

3. The method as defined in claim 1 further characterized in that the gas mixture is contacted with the solid adsorbent at a temperature in the approximate range of 0° F. to 210° F. and under a pressure between about 500 and about 2000 pounds per square inch, and in that the adsorbent is desorbed at a temperature between about 100° F. and about 500° F. under a lower pressure than is maintained during the contacting step.

4. The method as defined in claim 1 further characterized in that the solid adsorbent comprises activated carbon.

5. The method as defined in claim 1 further characterized in that the paraffins undergoing isomerization comprise normal butane.

6. The method as defined in claim 1 further characterized in that the paraffins undergoing isomerization comprise normal pentane.

HERMAN PINES.
HERMAN S. BLOCH.